(12) United States Patent
Keller

(10) Patent No.: US 6,371,074 B1
(45) Date of Patent: Apr. 16, 2002

(54) METHOD AND APPARATUS FOR PREVENTING BACKFIRING IN SPARK IGNITION, INTERNAL COMBUSTION ENGINES

(76) Inventor: John M. Keller, HC79, Box 130, Building B1, Canvas, WV (US) 26662

( * ) Notice: Subject to any disclaimer, the term of this patent is extended or adjusted under 35 U.S.C. 154(b) by 0 days.

(21) Appl. No.: 09/605,568

(22) Filed: Jun. 28, 2000

Related U.S. Application Data

(60) Provisional application No. 60/141,431, filed on Jun. 29, 1999.

(51) Int. Cl.$^7$ ................................................. F02B 77/00
(52) U.S. Cl. ........................... 123/198 DB; 123/198 DC
(58) Field of Search .................... 123/198 DB, 198 DC, 123/529

(56) References Cited

U.S. PATENT DOCUMENTS 4,111,175 A * 9/1978 Nakamura et al. .... 123/198 DC
5,357,935 A    10/1994 Oxley et al.

* cited by examiner

*Primary Examiner*—Tony M. Argenbright
*Assistant Examiner*—Katrina B. Harris
(74) *Attorney, Agent, or Firm*—Gardner Groff & Mehrman, P.C.

(57) ABSTRACT

A system and method for minimizing the likelihood of backfiring as a spark ignition, internal combustion engine is turned off. A fuel cut-off device stops the flow of fuel into the engine in response to an engine shut-off control signal, such as when the on-off keyswitch is moved from the "on" position to the "off" position. The ignition spark is maintained to the engine for a predetermined length of time after fuel shut-off. The delay time is selected to allow the fuel cut-off device to operate to stop the flow of fuel into the engine. In this way, for as long as the engine is turning over, the engine is provided with an electric spark for controlled ignition, thereby minimizing or eliminating backfiring.

28 Claims, 3 Drawing Sheets

METHOD AND APPARATUS FOR PREVENTING BACKFIRING IN SPARK IGNITION, INTERNAL COMBUSTION ENGINES

CROSS-REFERENCE TO RELATED APPLICATION

This application claims the benefit of U.S. Provisional Patent Application Serial No. 60/141,431, filed Jun. 29, 1999, the entire scope and content of which is hereby incorporated herein by reference.

BACKGROUND OF THE INVENTION

Spark ignition, internal combustion engines are in universally widespread use throughout the world. Such engines are used in automobiles, lawnmowers, lift vehicles, etc. In a typical spark ignition, internal combustion engine, fuel is mixed with air and is drawn into a combustion chamber. The air-fuel mixture is compressed and then an electric spark is provided to very rapidly combust the air-fuel mixture, thereby providing useful power as the rapidly-expanding, combusting gases push down on the top of the piston.

These engines require three basic components for proper operation. Firstly, an appropriate mixture of air and fuel is required. Secondly, the air-fuel mixture needs to be compressed to a certain minimum pre-combustion pressure. Thirdly, a sufficient electric spark (or other ignition initiator) is needed to ignite the compressed air-fuel mixture. The absence of any one of these three elements typically renders an engine inoperable (or results in an engine that will not operate properly). To stop the engine when desired, it is standard that the electric spark is taken away. This is accomplished by, for example, turning off the engine by switching a keyswitch from the "on" position to the "off" position. This has the effect of de-energizing the electric ignition system, thereby instantaneously denying the engine an electric spark, and shutting down the engine.

However, this method of shutting off an engine by simply turning off the electric spark can sometimes result in "backfiring" of the engine. This is so because even though the electric spark has been taken away, the engine continues to turn over due to its own inertia, and the continued operation of the engine (albeit without the electric spark) continues to draw fuel and air into the engine. If the engine has internal hot spots, such hot spots can ignite the air-fuel mixture despite the absence of any electric spark. Such hot spots may occur, for example, on exhaust valves, on the crown of a piston, or on the cylinder head wall. Oftentimes, such hot spots are the result of the build-up of carbon deposits, which carbon deposits, once heated, do not dissipate that heat very quickly. As the engine begins to slow toward a stop, a charge of air and fuel within one or more of the combustion chambers can auto-ignite due to the hot spots, as mentioned above. If this combustion from auto-ignition occurs while either an intake valve or exhaust valve is open, "backfiring" can be propagated through the open valve and into the intake or exhaust system. This backfiring is quite loud and unnerving to the operator of the vehicle and to others in the vicinity. This loud, unexpected noise is particularly bothersome when it occurs inside a building, rather than outside, such as when cars, trucks, or lift vehicles are operated within a factory. Such backfiring can also damage the engine.

To address this problem, it is known, in addition to denying the engine any further spark, to shut off the flow of fuel as early as possible after the keyswitch is moved to the "off" position. An example of such an arrangement is shown in U.S. Pat. No. 5,357,935 of Oxley et aL. The '935 patent describes an engine "shutdown circuit" which includes a solenoid-operated three-way valve connected to an electrical system such that when the key switch is switched off, delivery of fuel is interrupted as quickly as possible.

However, even if a system were devised that could operate to interrupt fuel delivery immediately upon movement of the key switch from the "on" position to the "off" position, such a system still cannot guarantee that the supply of fuel and air is instantaneously denied to the engine. This is so because there is a certain amount of air and fuel already in the fuel system downstream of where it can be cut off, and as the engine is shut down, it takes a finite amount of time for this air and fuel to work its way into the engine, there to be consumed. Thus, even though one can instantaneously shut off the supply of electric spark to the engine, it takes a finite amount of time before typical fuel systems can shut off the supply of fuel to the engine. Thus, for a short time, the engine is operated with no spark, but yet with air and fuel still supplied to the engine, thereby creating conditions that are still ripe for backfiring.

Accordingly, it can be seen that a need yet remains for a technique and apparatus for minimizing the likelihood of backfiring within spark ignition, internal combustion engines. It is to the provision of such a method and apparatus that the present invention is primarily directed.

SUMMARY OF THE INVENTION

Briefly described, in one aspect the present invention comprises a method for operating a spark ignition, internal combustion engine to minimize the likelihood of backfiring as the engine is turned off. The engine is of the type having an electrical ignition system for providing an ignition spark to the engine and further having a fuel system for admitting fuel into the engine. The fuel system is of the type having a cut-off device for stopping the flow of fuel into the engine in response to an engine shut-off control signal, such as when the on-off switch is moved from the "on" position to the "off" position.

The method of the invention comprises the step of maintaining the ignition spark to the engine despite the presence of an engine shut-off control signal and continuing to do so for a predetermined length of time after shut-off. The length of time is selected to allow the fuel cut-off device to operate to stop the flow of fuel into the engine. In this way, for as long as the engine is turning over, the engine is provided with an electric spark to prevent or avoid backfiring.

Preferably, the length of time for maintaining the ignition spark to the engine is on the order of several seconds. Preferably, the length of time is greater than one second or so. More preferably, the pre-determined length of time is more than one second and less than about ten seconds. Most preferably, the length of time for maintaining the ignition spark to the engine after the generation of an engine shut-off control signal is between about three and six seconds.

In another aspect, the present invention comprises an engine control system for use with a spark ignition, internal combustion engine to minimize backfiring of the engine as the engine is turned off. The engine is of the type having an electric ignition system for providing ignition spark to the engine and a fuel system. The engine control system preferably comprises a switch which is selectively operable between an "on" position for running the engine and an "off" position for turning off the engine. The engine control system preferably further includes a fuel shut-off device operable for interrupting delivery of fuel to the engine from the fuel system. The engine control system preferably further includes a control unit which is responsive to movement of the switch from the "on" position to the "off" position for maintaining operation of the electric ignition system for a length of time after the switch has been moved to the "off" position. The control unit preferably also is operable for selectively operating the fuel shut-off device for interrupting delivery of fuel from the fuel system to the engine upon the switch being moved from its "on" position to its "off" position.

In a further preferred embodiment, the control unit is operative to maintain operation of the electric ignition system for several seconds after the switch is moved to the off position. Preferably, the control unit is operative to maintain operation of the electric ignition system for more than 1 second and less than about 10 seconds. Most preferably, the control unit is operative to maintain operation of the electric ignition system for between about 3 seconds and 6 seconds. Preferably, the control unit comprises a delay-on-break timer.

Preferably, the fuel shut-off device is actuated by an engine vacuum source and the invention further includes a 3-way vacuum switch controlled by the control unit to effect control of the fuel shut-off device.

In an example embodiment, the engine is preferably of the type powered by liquid propane and the fuel shut-off device is placed in-line between a liquid propane tank containing liquid propane and a mixer in which air is mixed with propane for delivery to the engine. More preferably, the fuel shut-off device is placed in-line between the tank and a converter in which liquid propane is expanded to a gaseous state for delivery to the mixer.

Preferably, the fuel shut-off device includes a valve and a diaphragm for opening and closing the valve, and wherein with atmospheric pressure applied to one side of the diaphragm the valve is forced open and wherein with reduced pressure from the engine applied to the one side of the diaphragm the valve is forced closed. More preferably, the invention also includes an electrically controlled 3-way vacuum switch, which is electrically controlled by the control unit, and which is in fluid communication with atmosphere, engine vacuum, and the fuel shut-off device.

In yet another aspect, the present invention is an internal combustion engine comprising an electric ignition system; a fuel system; a switch operable between "on" and "off" positions; a fuel shut-off device operable to interrupt delivery of fuel from said fuel system; and a control unit for maintaining operation of said electric ignition system for a length of time after said switch is moved from the "on" position to the "off" position and for actuating said fuel shut-off device to interrupt delivery of fuel from said fuel system upon said switch being moved from the "on" position to the "off" position.

In further preferred form, the control unit is a delay-on-break timer. In still further preferred form, the fuel shut-off device is a pressure-actuated valve, and the engine further includes a vacuum switch in fluid communication with the pressure-actuated valve.

These and other objects, features and advantages of the present invention are described herein with reference to various preferred and example embodiments.

DETAILED DESCRIPTION OF PREFERRED EMBODIMENTS

Figure 1:
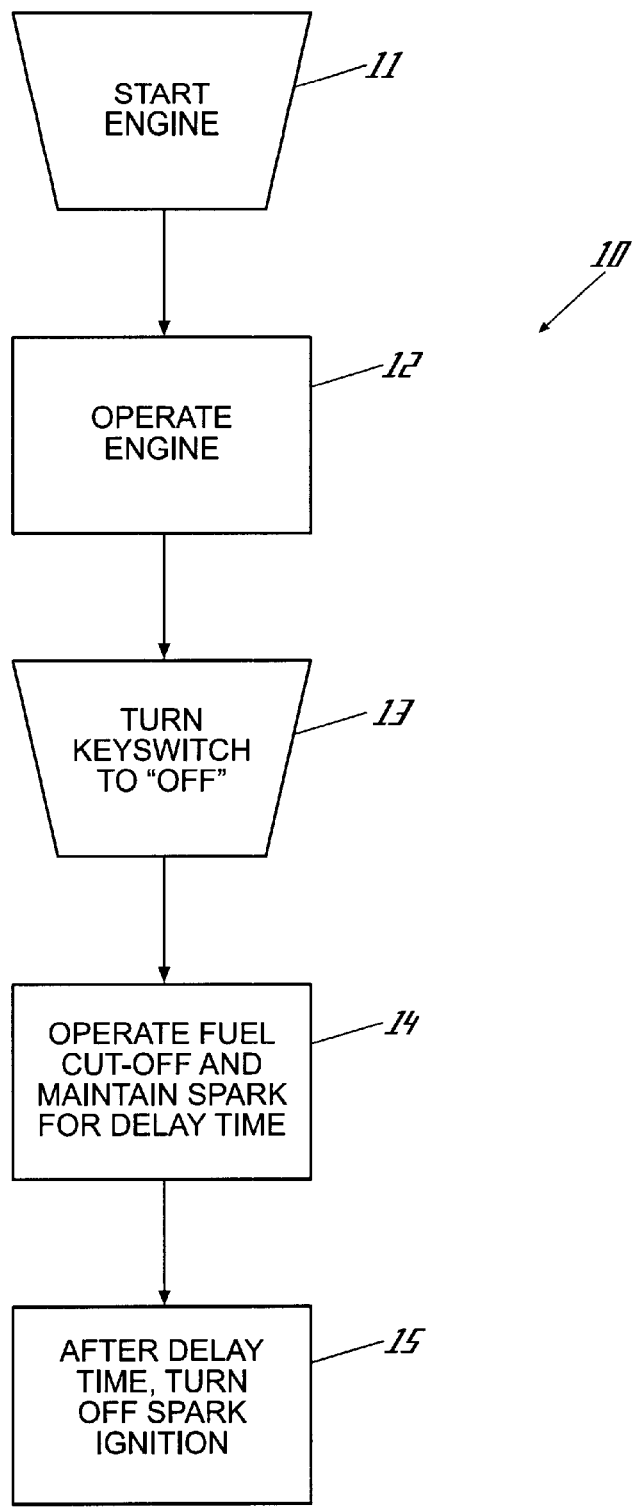
FIG. 1 is a schematic flow chart depicting a method for preventing backfiring in a spark ignition, internal combustion engine, according to a preferred form of the present invention.

Referring now in detail to the drawing figures, wherein like reference numerals represent like parts throughout the several views, FIG. 1 schematically depicts a method for preventing backfiring in spark ignition, internal combustion engines according to a preferred form of the invention. The method, depicted by the reference numeral 10, can be adapted for application to many different types of spark ignition, internal combustion engines, as will be readily understood by those of ordinary skill in the art in view of the disclosure herein. The method can be applied to two-stroke engines, four-stroke engines, engines used in automobiles, trucks, tractors, lift vehicles, off-road vehicles, lawn mowers, boat engines, and many other types of engines.

Method 10 preferably includes steps 11–15. In step 11, the engine is initially started. Typically, this occurs by operating a keyswitch or ignition switch which both provides electric power to the electric spark ignition system and turns the engine over to start the engine. After step 11, the engine is operated normally according to step 12. When it is desired to turn the engine off, the keyswitch is turned to the off position, as indicated by step 13. In normal prior art arrangements, the keyswitch is hard-wired to the ignition circuit such that turning off the keyswitch instantaneously turns off the electric ignition circuit. By contrast, according to the present invention, electric power continues to be applied to the electric ignition circuit even after the keyswitch has been turned to the off position, as indicated by step 14. As is also indicated by step 14, a fuel cut-off device is actuated upon switching the keyswitch off to starve the engine of fuel. Electrical power is maintained to the ignition system for a "delay time". Preferably the "delay time" is a predetermined, fixed period of time, preferably more than about 1 second and less than about 10 seconds. Longer periods of time provide a greater assurance that no backfiring will occur before the engine shuts down. However, it is unnecessary to have the delay time last for much longer than it typically takes for fuel to be emptied from the fuel system downstream of the fuel cut-off. With most fuel systems and typical fuel cut-off devices, a finite period of time elapses before the remaining fuel downstream of the cut-off device has worked its way through the fuel system and into the engine to be combusted. Accordingly, a delay time of a one second to several seconds is typically adequate to ensure that all of the fuel is burned before the ignition system shuts down. Accordingly, preferably the delay time is several seconds, typically 3 to 6 seconds. After the delay time has elapsed, the electrical power to the electric ignition system is turned off, as is indicated in step 15. At this point, the engine is completely stopped.

The novel method described herein takes a very different approach from the known prior art and achieves excellent results. In typical known prior art techniques and devices, the electrical power to the ignition system is turned off immediately upon the keyswitch being turned off, and then any remaining fuel passing through the fuel system is consumed without the benefit of an electric spark from the ignition system. By contrast, the present invention maintains the ignition system in operation for a predetermined interval of time after the keyswitch is shut off, thereby ensuring that there is a controlled spark available for fuel ignition after the keyswitch is turned to the off position as the engine moves to a shutdown. This helps to ensure that combustion takes place normally and controllably to the extent that any fuel remains in the system, rather than reverting to auto-ignition (and backfiring). Prototype testing of the invention has proven the concept to be extremely reliable in shutting down internal combustion engines while avoiding backfiring. It also prevents backfiring when the engine is restarted by making sure that there is no residual fuel in the engine when the engine stops.

Figure 2:
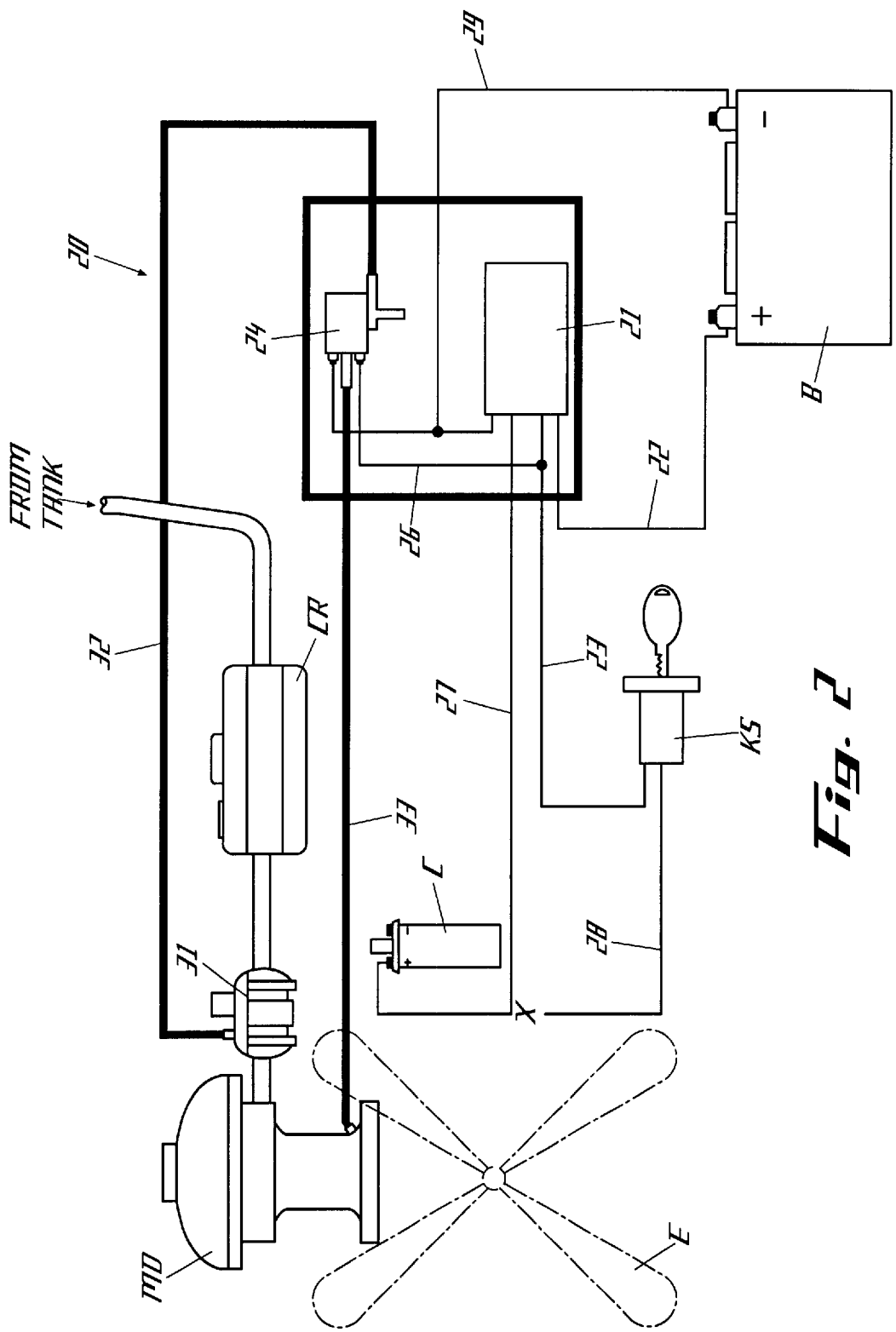
FIG. 2 is a schematic, functional diagram depicting a control system for preventing backfiring applied to a spark ignition, internal combustion engine, according to a preferred form of the invention.

Referring now to FIG. 2, an apparatus or control system 20 for carrying out the method depicted in FIG. 1 is disclosed according to a preferred embodiment. The control system 20 is for use with a spark ignition, internal combustion engine designated by the reference character E (and depicted by the schematic figure of a fan of an engine). The control system 20 preferably comprises a control module 21 that obtains electrical power from a battery B at all times along an electric lead 22. The control module 21 also receives input along another electric lead 23 from a keyswitch KS. When the keyswitch KS is in the "on" position, electrical power is provided through the keyswitch over electrical lead 23 to the control module 21 (the connection between the keyswitch and the battery, which is very conventional, is omitted from the figure for simplicity). This electrical signal is also provided to a 3-way vacuum valve 24 over a parallel electric lead 26. While the engine is in its normal running or "on" mode, the control module 21 outputs electrical power on an electric lead 27 to an ignition coil C of the electric spark ignition system. The keyswitch KS conventionally would be connected directly to the ignition coil along electrical lead 28. According to the present invention, and as shown in FIG. 2, the electrical lead 28 can be terminated (cut) as represented by an "X" at the end thereof, and the control module 21 installed as shown. Thus, for converting a normal, conventional spark ignition, internal combustion engine to take advantage of the novel method and apparatus of the present invention, one would cut the hard wire connection between the keyswitch and the ignition coil and add the control module 21 and wire it according to FIG. 2.

Both the control module 21 and the 3-way solenoid operated vacuum valve 24 are connected to the ground side or negative side of the battery, such as by an electric lead 29. In the commercial embodiment contemplated to exploit the present invention, the control module 21 is preferably a "delay-on-break timer" combining an electromechanical relay output with a digital timing circuit. Such "delay-on-break timers" are available with fixed timing delays, or external or knob-adjustable delay periods. Such a delay can be from as little as 200 milliseconds to as much as 100 minutes. Such components also have the advantage of being rugged and low-cost.

The control module 21 preferably operates to control the 3-way valve 24, which in turn preferably operates to control a fuel cut-off device 31. The fuel cut-off device 31 is preferably vacuum controlled to control the flow of fuel from a fuel tank (unshown) to a mixing device MD. The mixing device MD mixes the fuel with air and delivers it to the engine E. In a typical automobile engine running on gasoline, this is referred to as a carburetor. Alternatively, it can be a fuel injection system. The control system 20 can be used with engines that burn other fuels including vapor-type fuels such as propane, natural gas, butane, and so forth. In a vehicle operating on liquid propane, the mixing device is often referred to as a mixer. In a vehicle powered by liquid propane, there is often a "converter/regulator" CR positioned between the tank T and the mixing device MD. In such an application, the purpose of the converter is to convert the liquid propane into a gas which can then be mixed with air and inducted into the engine. The fuel cut-off device 31 preferably is located as close as possible to the engine (or at least to the converter/regulator) in the flow of fuel. Thus, preferably, the cut-off device 31 is positioned downstream of the converter/regulator CR, in-line between the mixing device and the converter/regulator. Alternatively, the fuel cut-off device 31 can be positioned in-line between the tank T and the converter.

The cut-off device 31 is preferably controlled through vacuum lines or airlines, such as line 32 and line 33. Line 33 is connected at one end to a source of reduced pressure, such as engine vacuum. An opposite end of line 33 is connected to the 3-way valve 24, ready to apply the reduced pressure or engine vacuum to the cut-off device upon demand. In the normal running or operating mode, the 3-way valve 24 is configured such that the line 32 is vented to the atmosphere such that atmospheric pressure is presented to the fuel cut-off device 31 (the fuel cut-off device includes an internal valve which is operated by a pressure-actuated diaphragm, as will be discussed in more detail in connection with FIG. 3). When it is desired to cut-off the supply of fuel to the mixing device MD, the 3-way valve 24 is operated to connect the source of reduced pressure or engine vacuum through line 33 to line 32 and thence onto the fuel cut-off device 31. In this way, the reduced pressure or engine vacuum is applied to the diaphragm within the fuel cut-off device.

When the keyswitch KS is turned to its off position, the control module 21 manipulates the 3-way valve 24 to close the valve within the fuel cut-off device 31, thereby interrupting the flow of fuel from the converter/regulator CR to the mixing device MD. As mentioned above, however, some period of time typically elapses after the valve of the fuel cut-off device 31 is closed until the small amount of fuel present in the fuel system between the fuel cut-off device 31 and the mixing device is consumed. In order to prevent backfiring, the control module continues to provide electric power to the ignition coil C along electric lead 27 for a selected period of time, as mentioned above, until that small quantity of fuel is consumed.

Figure 3:
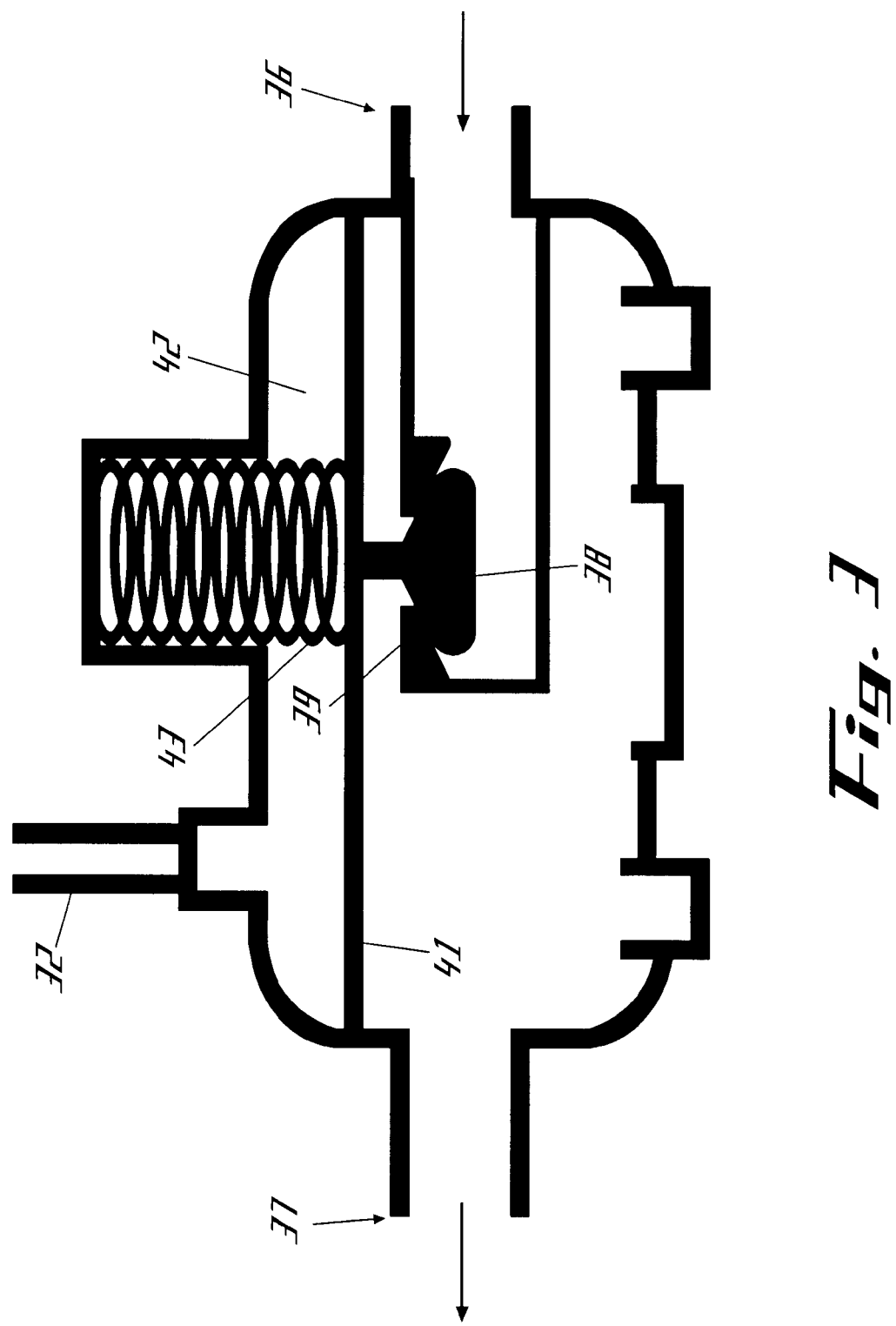
FIG. 3 is a schematic illustration of a fuel shut-off device portion of the control system of FIG. 2.

Referring now in detail to FIG. 3, the fuel cut-off device 31 can be seen in greater detail according to an example embodiment. It is to be understood, however, that the particular fuel cut-off device depicted in FIG. 3 is for illustrative purposes only. Indeed, there are a number of different types of fuel cut-off devices or techniques that can be employed to starve the engine of fuel while continuing to provide spark to the engine. However, the device depicted in FIG. 3 appears to have good application in this instance because of its simplicity and relatively low cost. The fuel cut-off device 31 has an input side 36 and an outlet 37. Thus, the fuel generally flows in through the inlet 36 and out through the outlet 37. Positioned therebetween is a valve 38 closable against a valve seat 39. When the valve is in its closed position against the valve seat 39, the flow of fuel is interrupted. When the valve is away from the valve seat 39, fuel is allowed to pass by the valve and out through the outlet 37. The valve 38 is attached to a diaphragm 41 and the diaphragm is biased by a bias spring 42 to urge the valve toward an open position. Should low pressure or vacuum be applied to the chamber 43 above the diaphragm 41, the low pressure or vacuum draws the diaphragm upwardly against the biasing force of the bias spring 42, thereby closing the valve 38 against the valve seat 39. On the other hand, if the chamber 43 is communicated to atmosphere, the bias force from the bias spring 42 forces the valve open.

One manner of implementing the present invention is to select a pre-determined length of time for the delay time for the ignition coil to be energized after the keyswitch has been switched to its off position. Alternatively, a sensor can be provided to determine whether the engine remains running, and to continue to provide electric spark for so long as the engine remains running, relying entirely on the fuel cut-off device to stall the engine. However, for simplicity, reliability, and safety reasons, it is presently considered preferable to maintain power to the ignition coil for a pre-determined length of time (delay time).

While the invention has been disclosed in preferred forms, it will be apparent to those skilled in the art that many modifications, additions, and deletions can be made therein without departing from the spirit and scope of the invention as set forth in the following claims.

What is claimed is:

1. A method of minimizing backfiring in a spark ignition, internal combustion engine having an electrical ignition system for providing ignition spark to the engine and having a fuel system for admitting fuel into the engine, the fuel system having a fuel cut-off device for stopping a flow of fuel into the engine in response to an engine shut-off control signal, the method comprising maintaining the ignition spark to the engine for a length of time after the engine shut-off control signal, the length of time being selected to allow the fuel cut-off device to operate to stop the flow of fuel into the engine, the ignition spark maintained to the engine through the same electrical path after shut-off as during engine operation.

2. A method of claim 1, wherein said length of time is on the order of several seconds.

3. The method of claim 1, wherein said length of time is greater than one second.

4. The method of claim 1, wherein said length of time is between about one second and ten seconds.

5. The method of claim 1, wherein said length of time is between about three and six seconds.

6. The method of claim 1, wherein ignition spark is maintained to the engine after the engine shut-off control signal without detecting engine rotation.

7. An engine control system for minimizing backfiring in a spark ignition, internal combustion engine having an electric ignition system and a fuel system, the engine control system comprising:
   a switch operable between "on" and "off" positions;
   a fuel shut-off device operable to interrupt delivery of fuel to the engine from the fuel system; and
   a control unit responsive to movement of said switch from the "on" position to the "off" position for maintaining operation of the electric ignition system for a length of time after said switch is moved to the "off" position, wherein ignition spark is maintained to the engine through the same electrical path after shut-off as during engine operation, and for operating said fuel shut-off device to interrupt delivery of fuel from the fuel system to the engine upon said switch being moved from the "on" position to the "off" position.

8. An engine control system as claimed in claim 7, wherein said switch is a keyswitch.

9. An engine control system as claimed in claim 7, wherein said control unit is operative to maintain operation of the electric ignition system for several seconds after said switch is moved to the "off" position.

10. An engine control system as claimed in claim 7, wherein said control unit is operative to maintain operation of the electric ignition system for more than one second after said switch is moved to the "off" position.

11. An engine control system as claimed in claim 7, wherein said control unit is operative to maintain operation of the electric ignition system for between about one second and ten seconds after said switch is moved to the "off" position.

12. An engine control system as claimed in claim 7, wherein said control unit is operative to maintain operation of the electric ignition system for between about three seconds and six seconds after said switch is moved to the "off" position.

13. An engine control system as claimed in claim 7, wherein said control unit comprises a delay-on-break timer.

14. An engine control system as claimed in claim 7, wherein said fuel shut-off device is actuated by engine vacuum and further comprising a 3-way vacuum switch controlled by said control unit to effect control of said fuel shut-off device.

15. An engine control system as claimed in claim 7, wherein the engine is powered by liquid propane fuel and wherein said fuel shut-off device is located in-line between a fuel tank and a mixer.

16. An engine control system as claimed in claim 7, wherein the engine is powered by liquid propane and wherein said fuel shut-off device is located in-line between a fuel tank and a converter.

17. An engine control system as claimed in claims 7, wherein said fuel shut-off device comprises a valve and a diaphragm for opening and closing said valve, and wherein with atmospheric pressure applied to one side of said diaphragm, said valve is forced open, and wherein with reduced pressure applied to said one side of said diaphragm, said valve is forced closed.

18. An engine control system as claimed in claim 17, further comprising an electrically controlled, 3-way vacuum switch, which is electrically controlled by said control unit and which is in fluid communication with atmospheric pressure, with engine vacuum, and with said fuel shut-off device.

19. An internal combustion engine comprising:
   an electric ignition system having an electrical path for supplying ignition spark to the engine during engine operation;
   a fuel system;
   a switch operable between "on" and "off" positions;
   a fuel shut-off device operable to interrupt delivery of fuel from said fuel system; and
   a control unit for maintaining operation of said electric ignition system for a length of time after said switch is moved from the "on" position to the "off" position, wherein ignition spark is maintained to the engine through the same electrical path after shut-off as during engine operation, and for actuating said fuel shut-off device to interrupt delivery of fuel from said fuel system upon said switch being moved from the "on" position to the "off" position.

20. The engine of claim 19, wherein said control unit comprises a delay-on-break timer.

21. The engine of claim 20, wherein said fuel shut-off device comprises a pressure-actuated valve, and wherein said engine further comprises a vacuum switch in fluid communication with said pressure-actuated valve.

22. An engine control system for minimizing backfiring in a spark ignition, internal combustion engine having an electric ignition system and a fuel system, the engine control system comprising:
- a switch operable between "on" and "off" positions;
- a fuel shut-off device operable to interrupt delivery of fuel to the engine from the fuel system, wherein said fuel shut-off device is actuated by engine vacuum;
- a 3-way vacuum switch for operating said fuel shut-off device; and
- a control unit responsive to movement of said switch from the "on" position to the "off" position for maintaining operation of the electric ignition system for a length of time after said switch is moved to the "off" position and for operating said 3-way vacuum switch to actuate said fuel shut-off device to interrupt delivery of fuel from the fuel system to the engine upon said switch being moved from the "on" position to the "off" position.

23. An engine control system for minimizing backfiring in a spark ignition, internal combustion engine having an electric ignition system, a fuel system, a fuel tank, and a mixer for combusting a fuel, the engine control system comprising:
- a switch operable between "on" and "off" positions;
- a fuel shut-off device operable to interrupt delivery of fuel to the engine from the fuel system, said fuel shut-off device is located in-line between the fuel tank and the mixer; and
- a control unit responsive to movement of said switch from the "on" position to the "off" position for maintaining operation of the electric ignition system for a length of time after said switch is moved to the "off" position and for operating said fuel shut-off device to interrupt delivery of fuel from the fuel system to the engine upon said switch being moved from the "on" position to the "off" position.

24. The engine control system of claim 23, wherein the engine further comprises a converter located in-line between the fuel tank and the mixer for using liquid propane fuel.

25. The engine control system of claim 24, wherein said fuel shut-off device is located in-line between the converter and the mixer.

26. An engine control system for minimizing backfiring in a spark ignition, internal combustion engine having an electric ignition system and a fuel system, the engine control system comprising:
- a switch operable between "on" and "off" positions;
- a fuel shut-off device operable to interrupt delivery of fuel to the engine from the fuel system, wherein said fuel shut-off device comprises a valve and a diaphragm for opening and closing said valve, and wherein with atmospheric pressure applied to one side of said diaphragm, said valve is forced open, and wherein with reduced pressure applied to said one side of said diaphragm, said valve is forced closed; and
- a control unit responsive to movement of said switch from the "on" position to the "off" position for maintaining operation of the electric ignition system for a length of time after said switch is moved to the "off" position and for operating said fuel shut-off device to interrupt delivery of fuel from the fuel system to the engine upon said switch being moved from the "on" position to the "off" position.

27. An engine control system as claimed in claim 26, further comprising an electrically controlled, 3-way vacuum switch, which is electrically controlled by said control unit and which is in fluid communication with atmospheric pressure, with engine vacuum, and with said fuel shut-off device.

28. An internal combustion engine comprising:
- an electric ignition system;
- a fuel system;
- a switch operable between "on" and "off" positions;
- a fuel shut-off device having a pressure-actuated valve operable to interrupt delivery of fuel from said fuel system;
- a vacuum switch in fluid communication with said pressure-actuated valve; and
- a control unit having a delay-on-break timer for maintaining operation of said electric ignition system for a length of time after said switch is moved from the "on" position to the "off" position and for actuating said vacuum switch to operate said fuel shut-off device to interrupt delivery of fuel from said fuel system upon said switch being moved from the "on" position to the "off" position.

* * * * *